United States Patent [19]

Story et al.

[11] Patent Number: 4,488,729
[45] Date of Patent: Dec. 18, 1984

[54] DRILL BOX

[75] Inventors: Thomas A. Story, State College; Edward P. Peglow, Eighty Four, both of Pa.

[73] Assignee: Step Design, Eighty Four, Pa.

[21] Appl. No.: 530,376

[22] Filed: Sep. 8, 1983

[51] Int. Cl.³ .............................................. F16J 15/34
[52] U.S. Cl. .......................................... 277/15; 277/67
[58] Field of Search ........................ 277/15, 67, 68, 92

[56] References Cited

U.S. PATENT DOCUMENTS

| | | | |
|---|---|---|---|
| 3,218,085 | 11/1965 | Grace | 277/68 |
| 3,806,135 | 4/1974 | Wiese | 277/15 |
| 3,843,140 | 10/1974 | Mayer | 277/67 |
| 3,853,327 | 12/1974 | Nellis | 277/67 |
| 3,968,969 | 7/1976 | Mayer et al. | 277/15 |
| 4,256,315 | 3/1981 | Larson et al. | 277/92 |
| 4,436,315 | 3/1984 | Hatch | 277/92 |

*Primary Examiner*—Robert I. Smith
*Attorney, Agent, or Firm*—Oldham, Oldham, Hudak & Weber Co.

[57] ABSTRACT

The invention comprises a novel method for lubricating and cooling mechanical seals, particularly those seals used in a vertical drill box system. Specifically, the invention utilizes the driving force of the rotating gears in the gear box to convey fluid to an otherwise inaccessible upper seal face. Cooling and lubricating the seal in this manner insures that the various rubber portions of the seal are not degraded by excessive heat. The invention can be utilized in any application requiring sealing of gearing mechanisms from environments containing large amounts of dust or other debris. A preferred application is in mining equipment.

9 Claims, 2 Drawing Figures

DRILL BOX

TECHNICAL FIELD

This invention lies in the art of mechanical seal design and more particularly in the field of lubrication means for seal faces. Specifically, the invention relates to a novel design for lubricating the upper seal of a vertical, double seal arrangement.

BACKGROUND ART

Mechanical seals have heretofore found wide use in a variety of industrial applications. In general, mechanical seals are used in those situations which require that a rotating shaft be isolated from the rotational drive. All seal designs incorporate a rotating face secured to the shaft and which is mated to a stationary face on the seal housing or other non-moving member. Sealing is provided at the point of contact between the two seal faces. Naturally, because these two surfaces are grinding against each other, friction is produced and consequently heat is generated.

In certain seal applications, particularly where the speed of rotation is relatively slow, the heat of friction can be dissipated through conduction in the metal portions of the shaft and seal housing. However, in many applications, the amount of heat buildup is sufficient so as to cause degradation of rubber or plastic sealing members which provide static sealment at various locations in the seal.

The deficiences of such prior art designs are most evident in seal designs used to protect gear housing commonly employed in mining operations. In addition to the frictional heat produced by the seal itself, heat is generated by rotation of the gears. The instant invention provides for a method of lubricating and cooling the seals in gear housings which utilizes the fluid pressure produced by motion of the gears themselves. To the applicant's knowledge, the prior art contains no similar design.

DISCLOSURE OF THE INVENTION

Is is accordingly an aspect of the invention to provide a lubricating system for a vertical mechanical seal.

Another aspect of the invention is to provide a lubricating system, as above, which circulates the lubricating fluid to provide cooling to the seal.

Yet another aspect of the invention is to provide a lubricating system, as above, which can be used at high shaft rotational speeds.

Still another aspect of the invention is to provide a lubricating system, as above, which is employed in a gear box.

Still another aspect of the invention is to provide a lubricating system, as above, which utilizes fluid pressure generated through rotation of gears in the gear box as the motive force for circulation.

Yet another aspect of the invention is to provide a lubricating system, as above, which employs a rotating vane to splash the lubricating fluid on the seal.

Still another aspect of the invention is to provide a lubrication system, as above, having a means for controlled recirculation of the fluid from the seal to the gears in the gear box.

These aspects and others detailed more fully in the description which follows, are achieved by: a sealing system for a vertical shaft gear box, comprising: a vertical mechanical seal, the rotating member of said seal secured to a vertical shaft through a seal retainer and the stationary member secured to the top cover of the gear box; a tube disposed within the housing of said gear box and positioned outside the arc proscribed by the rotating reduction gear of said gear box; a main reservoir of fluid in contact with said reduction gear, one end of said tube submerged therein; a secondary reservoir positioned beneath said seal, the second end of said tube in communication therewith; and a vane disposed within said secondary reservoir and attached to said seal retainer; wherein said seal retainer rotates with said seal rotating member, causing said vane to reservoir and attached to said seal retainer; wherein said seal retainer rotates with said seal rotating member, causing said vane to splash said fluid onto said seal; and wherein said rotating gear produces a fluid vortex in said main reservoir, causing said fluid to rise into said tube and be transferred to said secondary reservoir.

BRIEF DESCRIPTION OF THE DRAWINGS

In order to more fully understand the objects, techniques and structure of the invention, the description should be read in conjunction with the drawings, wherein.

BEST MODE FOR CARRYING OUT THE INVENTION

Figure 1:
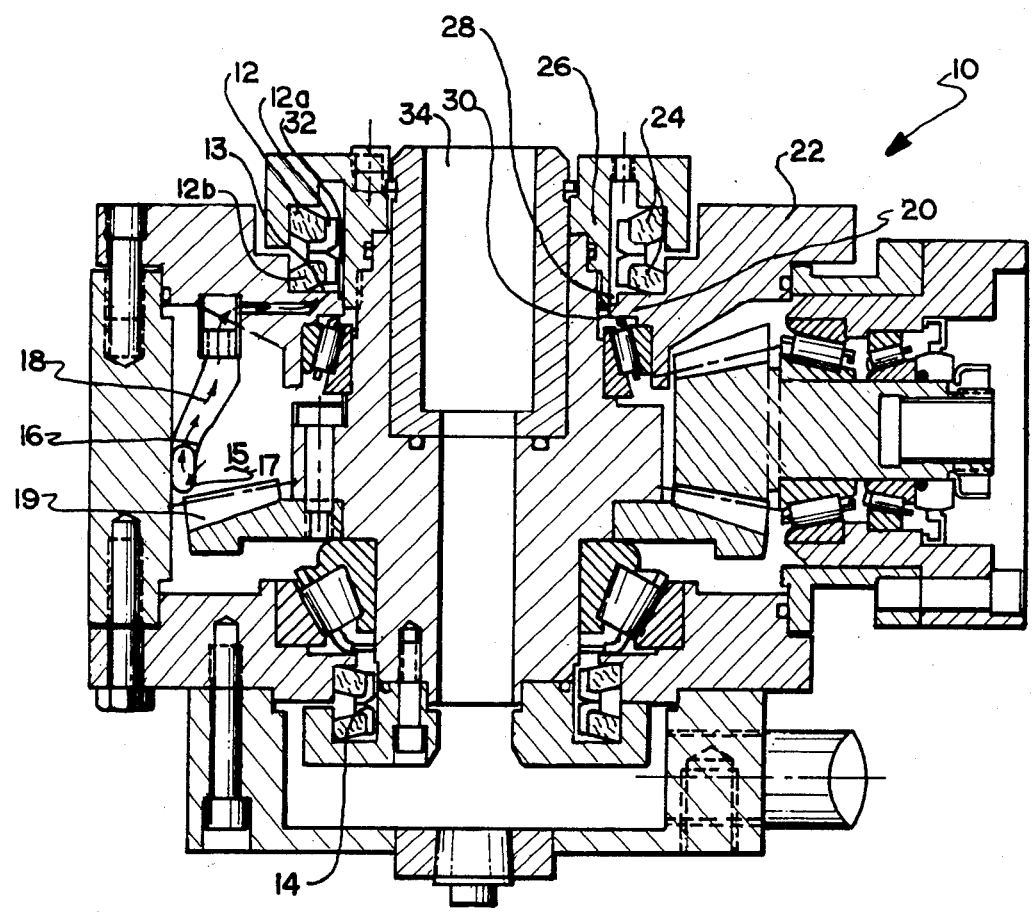
FIG. 1 is a cross sectional view of a drill box incorporating the lubricating system of the invention.

The structure and workings of the invention are best illustrated in FIG. 1, wherein a seal housing is indicated generally by the number 10. In this particular design, upper and lower seals 12 and 14, respectively, are employed to isolate the various components of a gear reduction mechanism. A main fluid reservoir 15 contains a quantity of lubricating oil which reduces the friction inherent in the operation of the mechanism. This fluid also functions to lubricate the lower seal 14 and simultaneously to act as a heat transfer fluid, carrying the heat generated by the contact between the stationary and rotating faces of the seal 14. Because the upper seal 12 in a vertical arrangement cannot easily be submerged in a lubricating fluid, the instant invention provides for a mechanism which transports the fluid to the upper seal. The path of the fluid can readily be seen in FIG. 1 where it is indicated by arrows 18. The driving force of the fluid is provided by the rotational movement of a reduction gear 19 which causes the lubricating fluid to swirl, producing a vortex. An aperture in the tube 16 positioned adjacent to the arc proscribed by the gear 19 admits fluid which is thereafter forced up into the tube by reason of hydrostatic pressure created in the vortex. Tube 16 is, in effect, a pitot tube applying the well known Bernoulli principle.

From the main reservoir, the fluid is carried to a secondary reservoir 13 which is positioned immediately below the stationary face 12b. There, the fluid is prevented from returning to the main reservoir 15 by a collar 20 which is an intergral part of the top cover of the gear box and which is in close tolerance with a seal retainer 26. Enough tolerance is provided so that the fluid returns to the main reservoir at a slow, controlled rate. Generally the tolerance is from about 0.015 to aobut 0.025 inches.

Once the fluid is conveyed to the secondary reservoir, the problem of contacting the rotating and stationary faces 12a and 12b, remains. Conveyance to the faces is accomplished by direct mechanical means employing a vane 32 attached to the seal retainer and pitched at an angle to facilitate splashing of the fluid onto the seal faces. The lower portion of the vane, as it rotates with the seal retainer, rests within a counterbore 28 in the collar 20. Being lower than, and in communication with the secondary reservoir, the counterbore is alternatively filled and emptied of fluid as the vane travels in its circular path. It is the volume of fluid displaced by the vane which is splashed onto the seal.

Cooling of the seal is important from the standpoint of preventing degradation of the various rubber parts contained in the seal, such as O ring 24. In a typical seal, O ring 24 applies axial force to hold the faces 12a and 12b together. In order to function properly, the O ring must have a certain degree of resiliency, which is lost when the ring is exposed to excessive heat. Besides O rings 24, rubber is used at other locations in this and other seal designs, as is well known in the art and these rubber parts are similarly affected by heat and so benefit from the cooling effect of the fluid.

Figure 2:
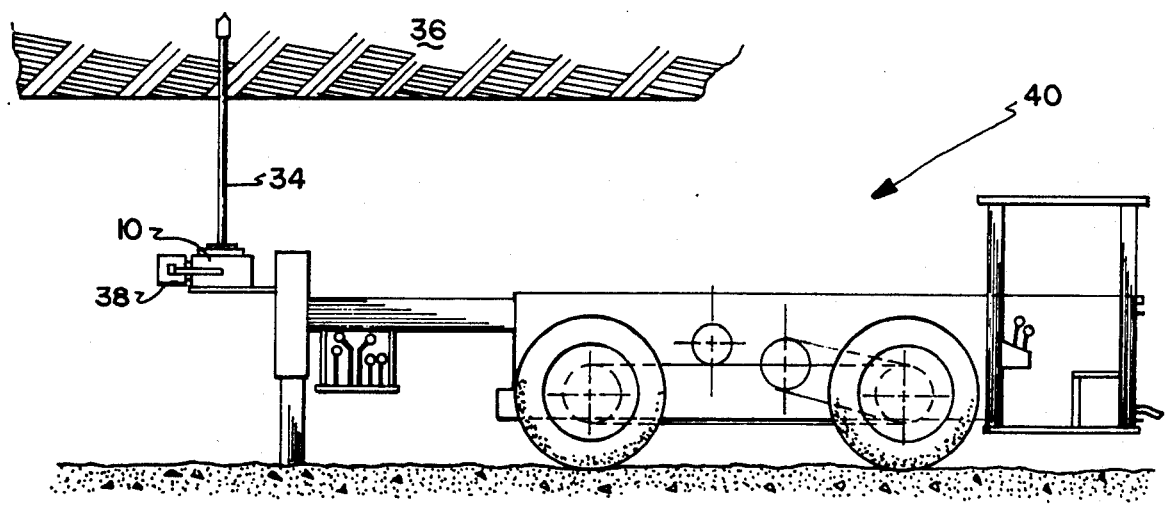
FIG. 2 illustrates how the invention is utilized in a piece of mining equipment.

An actual application of the invention can be seen with reference to FIG. 2, wherein a roof bolter is indicated generally by the number 40. A shaft 34 eminates from a gear housing 10 and into a mine roof 36. Power to the gear box is supplied by, typically, a hydraulic motor 38. This application illustrates the necessity for providing seals to a gear box, in that without seals, the internal gearing mechanism would soon become fouled with cuttings and other debris released from the bore as it is drilled. Preferred in this application are simply loaded face seals, which are particularly effective in excluding foreign matter.

With regard to the particualar dimensions of the various elements of the invention described above, these can be readily ascertained by a routineer in the art. The tube 16 and vane 32 normally are sized according to the dimensions of the gear box and face seals. Thus, the larger the seal, the more fluid circulation required for proper lubrication and cooling. In broad terms, the vane has a length of from about 0.75 to about 1.00 inches, a width from about 0.09 to about 0.10 inches and is pitched at an angle of from about 30 to about 40 degrees with about 30 degrees from the horizontal preferred. The vane can have a length of from about 0.75 to about 1.0 inches and a width of from about 0.09 to about 0.10 inches. Preferred dimensions of the vane are about 1×0.1×3/64 in thick. The tube has internal diameter of from about ¼ to about ⅜ inches with about 5/16 inches preferred. The tube aperture submerged in the vortex of the main fluid reservoir normally faces into the direction of flow, this being the position where the greatest hydrostatic pressure is realized. The aperture may face other directions however without departing from the scope of the invention. Generally, the seal of the invention may contain other aspects which are known in the art, such as various bearings, O rings, bolts and the like.

The above disclosure, in according to the Patent Statutes, describes the best mode and the embodiments of the invention. The invention should not, however, be construed as being limited thereby or thereto. Rather, for a true understanding of the scope of the invention, reference should be made to the following attached claims.

What is claimed is:

1. A sealing system for a vertical shaft gear box, comprising:
   a vertical mechanical seal, the rotating member of said seal secured to a vertical shaft through a seal retainer and the stationary member secured to the top cover of the gear box;
   a tube disposed within the housing of said gear box and positioned outside the arc proscribed by the rotating reduction gear of said gear box;
   a main reservoir of fluid in contact with said reduction gear, one end of said tube submerged therein;
   a secondary reservoir positioned beneath said seal, the second end of said tube in communication therewith; and
   a vane disposed within said secondary reservoir and attached to said seal retainer;
   wherein said seal retainer rotates with said seal rotating member, causing said vane to splash said fluid onto said seal; and
   wherein said rotating gear produces a fluid vortex in said main reservoir, causing said fluid to rise into said tube and be transferred to said secondary reservoir.

2. A sealing system according to claim 1, wherein said top cover includes a collar in close tolerance with said seal retainer and positioned at the bottom of said secondary reservoir, said tolerance allowing said fluid to return to said main reservoir at a controlled rate.

3. A sealing system according to claim 2, wherein said sealing system further includes a counterbore in said collar for receiving said vane, said counterbore in fluid communication with said secondary reservoir, and wherein the fluid volume of said counterbore is repetitively conveyed to said seal by the rotation of said vane therein.

4. A sealing system according to claim 3, wherein said vane is inclined at an angle from about 20 to about 45 degrees, has a length of from about 0.75 to about 1.0 inches and a width of from abcut 0.09 to about 0.10 inches.

5. A sealing system according to claim 4, wherein said tube has a diameter of from about ¼ to about 5/16 inches.

6. A sealing system according to claim 5, wherein the tolerance between said collar and said seal retainer is from about 0.015 to about 0.025 inches.

7. A sealing system according to claim 6, wherein said vane is inclined at an angle of about 30 degrees, has a length of about 1.0 inches and a width of about 0.10 inches.

8. A sealing system according to claim 7, wherein said tube has a diameter of about ¼ inches.

9. A sealing system according to claim 8, wherein said sealing system is used in mining equipment.

* * * * *